US011738491B2

(12) United States Patent
Klammer et al.

(10) Patent No.: US 11,738,491 B2
(45) Date of Patent: Aug. 29, 2023

(54) METHOD OF INFLUENCING A BACKPRESSURE LENGTH AND/OR A SCREW RETURN SPEED

(71) Applicant: ENGEL AUSTRIA GmbH, Schwertberg (AT)

(72) Inventors: Guenther Klammer, Aschbach Markt (AT); Erich Hochreiter, Schwertberg (AT); Klaus Fellner, Steyr (AT); Thomas Koepplmayr, Linz (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 336 days.

(21) Appl. No.: 17/104,193

(22) Filed: Nov. 25, 2020

(65) Prior Publication Data
US 2021/0162643 A1 Jun. 3, 2021

(30) Foreign Application Priority Data
Nov. 28, 2019 (AT) .............. A 51038/2019

(51) Int. Cl.
 *B29C 45/77* (2006.01)
 *B29C 45/18* (2006.01)
 (Continued)

(52) U.S. Cl.
 CPC .......... *B29C 45/77* (2013.01); *B29C 45/1808* (2013.01); *B29C 45/47* (2013.01); *B29C 45/50* (2013.01); *B29C 2945/76006* (2013.01); *B29C 2945/7619* (2013.01); *B29C 2945/76083* (2013.01); *B29C 2945/76354* (2013.01); *B29C 2945/76367* (2013.01); *B29C 2945/76454* (2013.01); *B29C 2945/76461* (2013.01);
 (Continued)

(58) Field of Classification Search
 CPC ...... B29C 45/1808; B29C 2945/76367; B29C 2945/76846; B29C 2945/76354; B29C 2945/76832
 See application file for complete search history.

(56) References Cited

U.S. PATENT DOCUMENTS 6,340,439 B1   1/2002 Hiraoka
9,662,818 B2   5/2017 Straka
                     (Continued)

FOREIGN PATENT DOCUMENTS

CN  102189654   9/2011
CN  105365172   3/2016
           (Continued)

OTHER PUBLICATIONS

Translation of JP-2005035132-A (Year: 2005).*

*Primary Examiner* — Xiao S Zhao
*Assistant Examiner* — John J DeRusso
(74) *Attorney, Agent, or Firm* — Wenderoth, Lind & Ponack, L.L.P.

(57) ABSTRACT

A method of influencing a backpressure length and/or a screw return speed in an axially extending plasticizing cylinder of a plasticizing unit for an injection moulding machine including a plasticizing screw arranged displaceably and rotatably in a cylinder bore of the plasticizing cylinder. Metering of plastic granulate fed to the plasticizing unit is carried out in dependence on the desired backpressure length in the plasticizing unit, and the plasticizing unit is operated in underfed mode.

21 Claims, 8 Drawing Sheets

(51) Int. Cl.
    *B29C 45/47* (2006.01)
    *B29C 45/50* (2006.01)
(52) U.S. Cl.
    CPC ............... *B29C 2945/76474* (2013.01); *B29C 2945/76498* (2013.01); *B29C 2945/76568* (2013.01); *B29C 2945/76598* (2013.01); *B29C 2945/76665* (2013.01); *B29C 2945/76832* (2013.01); *B29C 2945/76846* (2013.01); *B29C 2945/76936* (2013.01)

(56) References Cited

U.S. PATENT DOCUMENTS

| | | |
|---|---|---|
| 2011/0215496 A1 | 9/2011 | Ogura et al. |
| 2016/0046054 A1 | 2/2016 | Straka |

FOREIGN PATENT DOCUMENTS

| | | | | |
|---|---|---|---|---|
| DE | 10 2007 012 199 | | 9/2008 | |
| DE | 10 2013 012 067 | | 1/2014 | |
| DE | 10 2015 010 245 | | 2/2016 | |
| EP | 2 814 654 | | 4/2020 | |
| JP | 2004-188798 | | 7/2004 | |
| JP | 2005035132 A | * | 2/2005 | ............. B29C 45/50 |
| WO | 2019/096613 | | 5/2019 | |

* cited by examiner

METHOD OF INFLUENCING A BACKPRESSURE LENGTH AND/OR A SCREW RETURN SPEED

BACKGROUND OF THE INVENTION

The invention concerns a method of influencing a backpressure length and/or a screw return speed in an axially extending plasticizing cylinder of a plasticizing unit for an injection moulding machine, comprising a plasticizing screw arranged displaceably and rotatably in a cylinder bore of the plasticizing cylinder. In addition, the invention concerns an injection moulding machine including at least one axially extending plasticizing cylinder of a plasticizing unit comprising a plasticizing screw arranged displaceably and rotatably in a cylinder bore of the plasticizing cylinder and at least one closed-loop and/or open-loop control device, in which the at least one closed-loop and/or open-loop control device is or can be connected to the injection moulding machine by way of a signal transmission.

A method of producing plastic mouldings from residence time-critical plastic material with a plasticizing unit which can be operated in underfed mode is already known from WO 2019/096613. The method compares a target mass flow and an actual mass flow or a target metering capacity and an actual metering capacity to manipulate a rotary drive of the plasticizing screw. The actual mass flow is calculated from the screw return speed of the plasticizing screw during a melt metering process and further parameters, with re-adjustment of the actual mass flow or the metering capacity being effected.

A disadvantage with the state of the art is that the parameter of backpressure length that is relevant for the metering process is not considered. In addition the screw return speed is only used for calculation of the actual mass flow, with control being effected by way of the rotary drive of the metering member. The screw return speed per se however cannot be adjusted by the method and also a correlation with the backpressure length in the plasticizing cylinder is not taught.

In addition, a disadvantage in the state of the art without underfeed is that high torque levels for a plasticizing cylinder are problematical in regard to protecting components of the injection moulding machine, a quality of a melt and a quality of the plastic moulding to be injection-moulded, predominantly when dealing residence time-critical plastic granulate, with a completely filled plasticizing screw. In addition, with a fully filled plasticizing screw, the screw return speed in principle can admittedly be subjected to closed-loop control, but closed-loop control of the screw return speed has an adverse effect on constancy of further process parameters, in particular those process parameters which are related to the backpressure length.

SUMMARY OF THE INVENTION

A technical object of the present invention is therefore that of providing a method improved over the state of the art of the influencing the backpressure length and/or the screw return speed in the plasticizing cylinder and an injection moulding machine, in which the disadvantages of the state of the art are at least partially overcome and which are distinguished in particular by an improved possible way of controlling a degree of underfeed of the injection moulding machine.

According to the invention, metering of plastic granulate fed to the plasticizing unit is carried out in dependence on the desired backpressure length in the plasticizing unit, wherein the plasticizing unit is operated in underfed mode.

That first makes it possible for the backpressure length and/or the screw return speed to be precisely adjusted by metering of the plasticizing screw in an underfeed mode of operation.

According to the invention, the plasticizing screw is underfed during the metering operation. Underfeeding means that less plastic granulate is fed to the plasticizing screw for example by way of an external metering device, than it can convey in an intake zone. In that way the screw flights are completely filled only as from a given spacing from the intake opening. From that point the build-up of pressure also begins in the plasticizing unit.

The technical term backpressure length is defined by the extent of plastic material in the axial direction of the plasticizing cylinder between an injection nozzle and a compacting point, wherein the screw flights of the plasticizing screw are completely filled at the compacting point. The compacting point represents the boundary between a partially filled region of the plasticizing screw and a closed solids bed.

The technical term screw return speed is defined by an axial speed of the plasticizing screw during a metering operation by way of the plasticizing cylinder.

In the injection moulding process, the backpressure length can be influenced by a degree of material addition. The screw return speed can be influenced by a dynamic pressure, a screw peripheral speed and/or the material addition.

With a predetermined screw peripheral speed, a low level of material addition to the plasticizing cylinder determines a low backpressure length.

With a predetermined backpressure length, it is possible to implement different screw return speeds. The screw return speed depends for example on the peripheral speed of the plasticizing screw.

The underfed plasticizing unit entails a reduction in an effective screw length, whereby lower pressures in the plasticizing cylinder, later melting of the plastic granulate and shorter residence times of the plastic granulate are involved.

The shorter residence times of the plastic granulate permit lower melting temperatures whereby the quality of the plasticized plastic granulate and the quality of the injection-moulded plastic moulding are increased.

Closed-loop control of the backpressure length has the advantage over previously predominantly applied methods of torque control that the torque admittedly depends on the backpressure length but also on a plurality of further factors like for example cylinder and material temperatures which can influence the control. Added to that is the positive property that negative effects on components, melt quality and/or plastic moulding quality can also be reduced at high levels of torque by virtue of the underfeed.

Upon a prolongation of the effective screw length by virtue of a reduction in the degree of underfeed, a position of a first pressure build-up moves in the direction of a filling opening. As a result, complete filling of screw flights of the plasticizing screw is already effected at an earlier screw flight, starting from the filling opening in the direction of the screw tip. That results in increased pressures along the plasticizing screw, earlier melting of the plastic granulate and longer residence times of the plastic granulate and thus higher melting temperatures in regard to plasticization of the plastic granulate.

Metering of plastic granulate fed to the plasticizing unit can be implemented by means of commercially usual gravimetric and/or volumetric metering units. Depending on the supplied volume flow of the plastic granulate of the plastic to be plasticized in that way the position of the initial pressure build-up can be varied, which corresponds to a change in an operative or effective screw length of the plasticizing screw. In that way, for example, the backpressure length in the plasticizing screw can be adjusted.

The screw return speed as a single parameter is not sufficient for knowing how much plastic material is in the plasticizing cylinder.

As with very low backpressure lengths very high screw return speeds are no longer possible, knowing the backpressure length, in particular in regard to the screw return speed, is useful.

With a known backpressure length, it is particularly advantageously possible to act on the screw return speed.

A known screw return speed can facilitate closed-loop control of the backpressure length.

As stated in the opening part of this specification, an injection moulding machine includes at least one axially extending plasticizing cylinder of a plasticizing unit comprising a plasticizing screw arranged displaceably and rotatably in a cylinder bore of the plasticizing cylinder and at least one closed-loop and/or open-loop control device. The at least one closed-loop and/or open-loop control device is or can be connected to the injection moulding machine by way of a signal transmission, wherein the at least one closed-loop and/or open-loop control device is configured in at least one operating mode to carry out such a method of influencing the backpressure length and/or the screw return speed.

Particularly preferably in the injection moulding machine, the backpressure length and/or the screw return speed can be ascertained by at least one sensor preferably arranged in and/or at a cylinder wall of the plasticizing cylinder.

Particularly preferably, the backpressure length is 50 to 90 percent, preferably 60 to 80 percent, of a useable longitudinal extent of the plasticizing screw.

The term plastic granulate as the moulding material is to be interpreted broadly such that the term plastic granulate is not to be understood as denoting merely granular and solid moulding material but moulding material in an already partially fluid or melted fluid phase is also included. Particularly in a multi-stage plasticizing method, plastic granulate was already at least partially plasticized, preferably in a first plasticizing cylinder, and melt is transferred to a preferably further plasticizing unit. In general terms, however, it is also possible to provide a single-stage plasticizing method with melt.

Preferably, metering of plastic granulate fed to the plasticizing unit is carried out in dependence on the desired screw return speed in the plasticizing unit.

According to an advantageous configuration of the invention, the plasticizing screw is underfed during the metering operation in such a way that the backpressure length in the plasticizing screw is constant.

A constant backpressure length during the underfeed permits a high quality of a melt of the fed plastic material in the plasticizing screw. A more homogenous and/or more isotropic melt can be particularly promoted by a constant backpressure length, wherein for example faults in the injection-moulded plastic moulding due to a defective melt are reduced.

A constant backpressure length is particularly desirable for residence time-critical materials like for example plastic materials including polymers with large molecule chains and/or plastics having sensitive material-specific characteristics.

Advantageously, the plasticizing screw is underfed during the metering operation in such a way that the backpressure length in the plasticizing screw is shortened.

If less material is fed during the metering operation, the torques acting in the plasticizing unit are reduced and a residence time of the plastic in the plasticizing cylinder can be reduced by a lesser extent of the plastic material in the plasticizing cylinder. In addition, shearing effects in the plasticizing screw are reduced and material degradation in the plasticizing cylinder is minimised.

It has been found to be desirable if the plasticizing screw is underfed during the metering operation in such a way that the backpressure length in the plasticizing screw is increased.

If the backpressure length is too short to ensure the material properties necessary for an injection moulding cycle in the plasticizing cylinder the quality of the melt can be increased by an increase in the backpressure length in the plasticizing screw.

According to an advantageous embodiment of the invention, the plasticizing screw is underfed during the metering operation in such a way that the screw return speed in the plasticizing screw is constant.

An advantageous variant provides that the plasticizing screw is underfed during the metering operation in such a way that the screw return speed of the plasticizing screw is reduced.

In an embodiment of the invention, the plasticizing screw is underfed during the metering operation in such a way that the screw return speed of the plasticizing screw is increased.

Depending on demands on the plastic moulding to be injection-moulded, the melt of the plastic granulate, and/or the plasticizing unit, it is possible to take account of the individual aspects of one or more injection moulding cycles of the injection moulding machine by adjustment of the screw return speed.

A preferred implementation of a closed-loop control of the screw return speed for optimizing melt quality and/or mixing effect is as follows:

- a screw rotary speed and/or a screw peripheral speed and a metering stroke is predetermined, for example, by a user of the injection moulding machine,
- on the assumption that a metering zone is determinant for a conveyor capacity of the plasticizing screw a conveyor amount per unit of time with a pure drag flow ensues on the basis of a cross-section and/or parameters like pitch, land width, flight depth, radii and so forth in the metering zone and the screw peripheral speed,
- that gives the screw return speed of the screw, wherein the screw return speed can be numerically calculated and/or estimated,
- wherein depending on the actual conveyor performance of the plasticizing screw a dynamic pressure pattern can be ascertained as a function of the metering stroke and/or time and the parameters (for example dynamic pressure and/or area under the dynamic pressure curve and/or mean value of a dynamic pressure and/or maximum dynamic pressure) of the dynamic pressure variation can be used for closed-loop control of a metering device,
- wherein depending on the respective assumed pressure flow which is superimposed with the applied drag flow the melt quality and/or a mixing action in respect of the plastic material in the plasticizing screw changes.

For closed-loop control of the backpressure length, suitable sensors are installed axially over a length of the plasticizing cylinder, in particular however over a length of the intake zone, wherein the sensors establish whether the plastic granulate was already compacted at a specific point recorded by the sensors.

Those sensors measure continuously during a screw return in order by interpolation to be able to derive a closed curve in respect of the backpressure length, wherein the backpressure length is corrected by a volume which has already been metered.

The measured curve of a cycle is used as the starting point for a following cycle. That however does not represent a limitation as, in a stationary (steady) state no or only very slight changes are expected between the cycles.

A controlled backpressure length permits control of the residence time. In addition it is guaranteed that the intake zone of the injection moulding machine remains partially filled and this therefore gives improved rearward degassing. By virtue of the improved rearward degassing easily volatile constituents can be sucked away and/or a protective gas can be applied to prevent oxidation. In that way the polymers of the plastic granulate can be particularly carefully processed.

Closed-loop control of the screw return speed can be implemented in the form of a cascade closed-loop control. Cascade control is a departure from classic closed-loop control of the dynamic pressure, and the dynamic pressure and/or the screw peripheral speed of the plasticizing screw as well as a metered amount of plastic granulate are used as setting variables for control of the screw return speed.

The screw return speeds can be predetermined and controlled by way of control of the injection moulding machine. Constant screw return speeds which entail a stable processing procedure and controlled residence times are particularly advantageous.

Software for implementing the method according to the invention can provide an injection moulding machine which operates the metering unit in a rotary speed range which is correct for the demands of a plastic moulding which is to be injection-moulded and/or the plasticizing unit, and which can maintain that rotary speed range.

The metering unit is relevant in regard to its use in injection moulding technology, in particular in relation to a use of bulk material pumps in injection moulding. The type of metering unit is generally of any type; however bulk material pumps are particularly preferred.

Preferably, the backpressure length is ascertained by way of at least one sensor preferably arranged in and/or at a cylinder wall of the plasticizing cylinder.

The at least one sensor makes it possible to ascertain the backpressure length in the plasticizing screw at any time during and/or between injection cycles.

The screw return speed can generally also be recorded by at least one sensor and/or by a machine control system of the injection moulding machine.

Calculation of the screw return speed with a known backpressure length or of the backpressure length with a known screw return speed is possible, preferably having regard to parameters of the injection moulding machine like geometrical parameters or operational characteristics.

It has proven to be advantageous if at least one sensor is in the form of a pressure sensor and/or an ultrasound sensor and/or a capacitive sensor and/or an optical sensor.

Depending on the required accuracy of the backpressure length to be ascertained, the factors of the plasticizing unit (for example when there are heating strips) and planned costs of the plasticizing unit different types of sensor represent the best choice of sensor to observe the intake zone.

Preferably, the screw return speed is closed-loop controlled in dependence on at least one sensor signal of at least one optionally present sensor and/or a screw retraction curve, preferably at least of a preceding cycle.

By way of example, at least one sensor can ascertain the currently prevailing backpressure length and/or the currently prevailing screw return speed, wherein the screw return speed is adapted having regard to a history of screw return curves. In general, it is also possible to use sensor signals from preceding cycles for closed-loop control of the screw return speed.

By way of example, the screw return speed can be controlled by the at least one sensor signal, in which case in dependence on a degree of underfeed it is possible to create varying screw retraction curves which can be adjusted both by consideration of the backpressure length and also by way of the at least one sensor.

According to a particularly preferred embodiment of the invention, there is at least one further plasticizing unit, to which moulding material of the plasticizing unit is metered and wherein the moulding material is fed in dependence on the desired backpressure length and/or the desired screw return speed in the at least one further plasticizing unit, wherein the at least one further plasticizing unit is operated in underfed mode.

In that way, a process constancy can be enhanced, energy consumption can be minimised and quality of the melt can be increased. By way of example, moulding material in solid form is fed to the plasticizing unit—in which respect a feed of melt is also possible—and the moulding material is plasticized. The melt can then be metered to the at least one further plasticizing unit, wherein underfeed and/or closed-loop control of the backpressure length and/or the screw return speed can be provided both in the plasticizing unit and also in the at least one further plasticizing unit.

The at least one further plasticizing unit can be for example in the form of an extruder.

The backpressure length is generally of essential importance for the underfed process as the backpressure length can be used as an actively used plasticizing screw length in order to keep an input of energy into the melt constant, for example, with the backpressure length being kept constant.

BRIEF DESCRIPTION OF THE DRAWINGS

Further details and advantages of the present invention are described more fully hereinafter with reference to exemplary embodiments illustrated in the drawings, in which.

DETAILED DESCRIPTION OF THE INVENTION

Figure 1A:
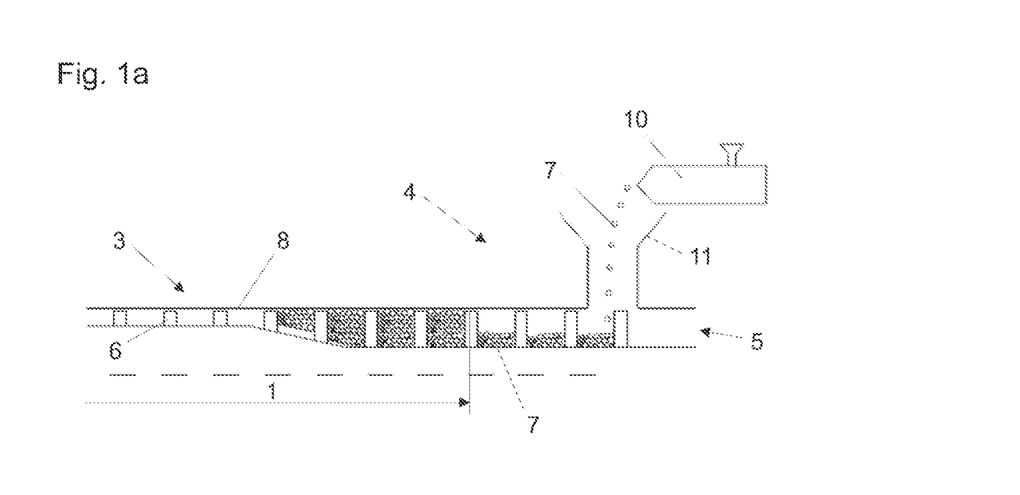
FIGS. 1a-1b are a diagrammatically illustrated sectional view from the side of a plasticizing unit according to a preferred embodiment, wherein a backpressure length is shown during an underfeed situation and a plasticizing unit which is not according to the invention and which is not operated in an underfeed mode.

FIG. 1a shows a backpressure length 1 in an underfed state of a plasticizing unit 4 having a plasticizing screw 6, the plasticizing screw 6 being arranged in a cylinder bore 5 of a plasticizing cylinder 3. The plasticizing screw 6 is disposed rotatably and displaceably in the plasticizing cylinder 3.

Plastic granulate 7 is fed to the plasticizing unit 4, wherein metering of the plastic granulate 7 is effected by way of a metering unit 10 in such a way that the plasticizing unit 4 is operated in an underfed mode.

The degree of underfeed or the amount of material feed is selected depending on the desired backpressure length 1 and/or a desired screw return speed 2 (this is not shown in the drawing).

The backpressure length 1 is given by a length of the plasticizing screw 6, that is fully filled with plastic granulate 7, in the direction of an injection nozzle of the plasticizing cylinder 3 (the injection nozzle is not shown but is at the left in the view). In general, in that considered situation, the plastic granulate 7 can already be in a fluid phase or a mixed phase comprising solid and liquid plastic regions.

For reasons of clarity of the drawing, only the upper part of the plasticizing cylinder 3, the plasticizing screw 6, and a cylinder wall 8 of the plasticizing cylinder 3 is shown.

During the metering operation, the plasticizing screw 6 is underfed by a filling hopper 11 in such a way that the backpressure length 1 in the plasticizing screw 6 remains constant.

Metering is effected in such a way that a given degree of underfeed is set. Complete filling of screw flights of the plasticizing screw 6 is effected in the eighth illustrated screw flight, starting from the injection nozzle.

Figure 1B:
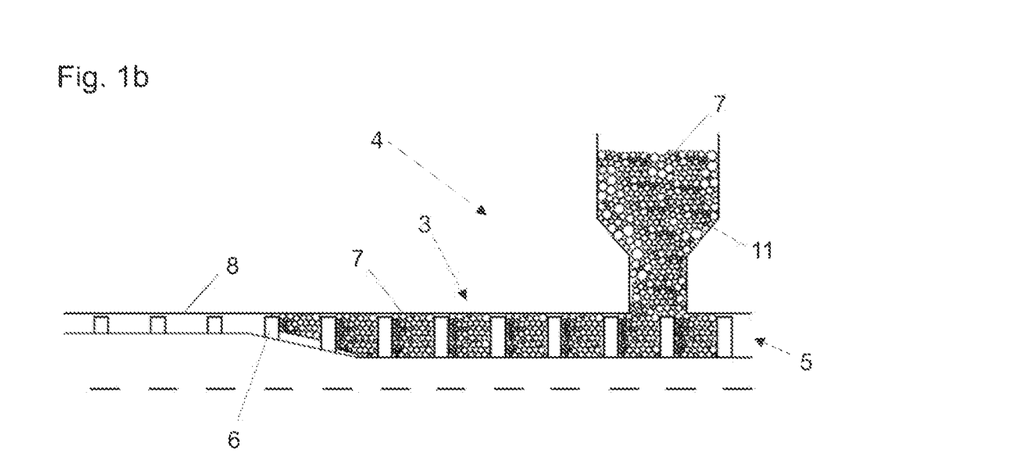

FIG. 1b shows a completely filled plasticizing screw 6, and this does not involve an underfeed process as is provided according to the invention. The filling hopper 11 steadily meters plastic granulate 7 to the plasticizing cylinder 3 in order to constantly permit a fully filled plasticizing screw 6.

Figure 2A:
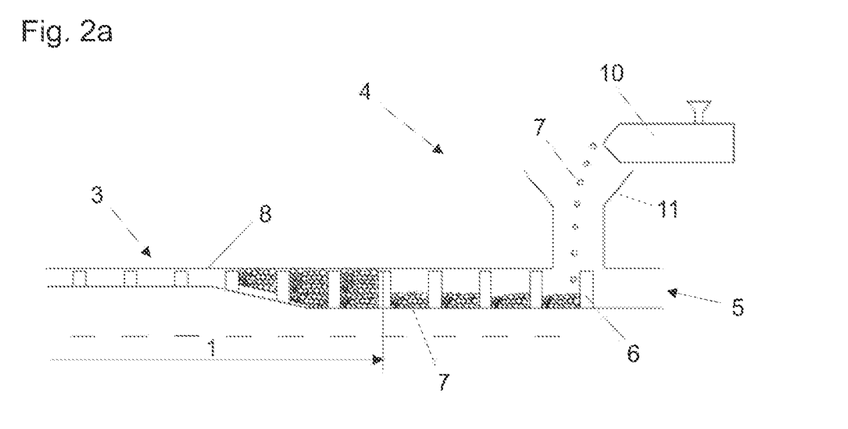
FIGS. 2a-2b show the plasticizing unit of the FIG. 1a embodiment with a reduction in the backpressure length and an increase in the backpressure length.

FIG. 2a shows the plasticizing screw 6 during the metering operation, in which respect the arrangement is operated in the underfeed mode in such a way that the backpressure length 1 is shortened during a plasticizing phase in relation to the degree of underfeed shown in FIG. 1a.

The plastic granulate 7 is fed to the plasticizing screw 6 by a dosing device (metering unit 10), wherein screw flights are completely filled over an extent of the backpressure length 1 and there are screw flights which are not completely filled in the view at the right of the backpressure length 1.

By virtue of metering of plasticized plastic in the region between the injection nozzle (not shown) and the tip of the plasticizing screw 6 (a space in front of the screw), the plasticizing screw 6 is moved away from the injection nozzle. In that case, a so-called mass cushion is formed in the space in front of the screw.

There is also a possibility of influencing the backpressure length 1, for example, by a targeted increase or reduction in the length of the plasticizing screw 6.

Starting from the injection nozzle the first seven illustrated screw flights of the plasticizing screw 6 are completely filled, with the eighth screw flight already being only partially filled here.

Figure 2B:
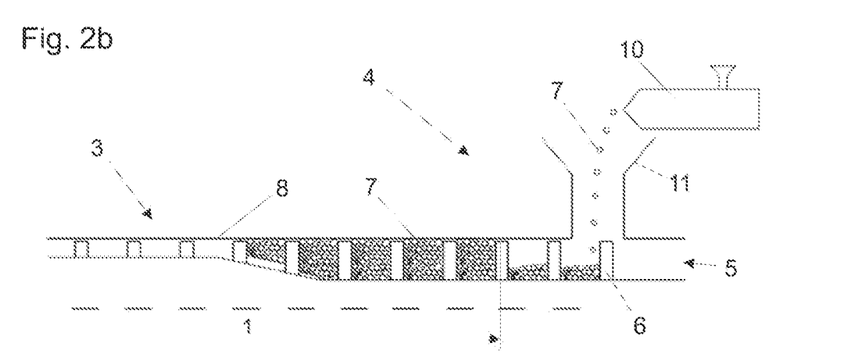

FIG. 2b shows the plasticizing screw 6 during the metering operation, wherein the addition of material is effected in an underfed fashion in such a way that an effective screw length of the backpressure length 1 increases during the plasticizing phase in relation to the degree of underfeed shown in FIG. 1a.

That affords a new setting parameter of an injection moulding machine 15, which permits closed-loop control of the backpressure length 1 and/or the screw return speed 2.

Starting from the injection nozzle, the first nine illustrated screw flights of the plasticizing screw 6 are completely filled, wherein the tenth screw flight is already only partially filled.

Figure 3:
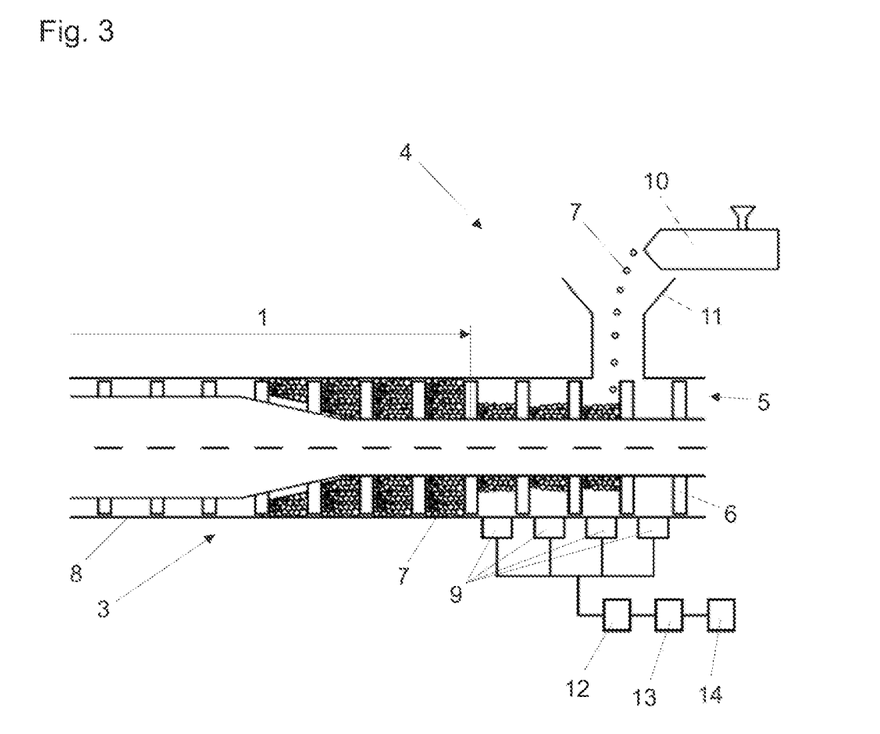
FIG. 3 shows the plasticizing unit of the FIG. 1a embodiment with a sensor unit for measuring the compacting point in an intake zone or the backpressure length respectively in the plasticizing screw.

FIG. 3 shows the plasticizing unit 4 also with the regions of the plasticizing cylinder 3, the plasticizing screw 6, and the cylinder wall 8, arranged beneath a broken line.

The backpressure length 1 is ascertained by four sensors 9, the four sensors 9 being arranged at the cylinder wall 8 of the plasticizing cylinder 3.

The sensors 9 can be respectively in the form of a pressure sensor, an ultrasound sensor, a capacitive sensor or an optical sensor. Particularly preferred are sensors 9 in the form of ultrasound sensors, in which case ultrasound pulses are sent through the plastic granulate 7 between an ultrasound transmitter and an ultrasound receiver. Based on the transit time of the ultrasound pulses, it is possible to infer a degree of filling of the screw flights in the plasticizing screw 6. In that case, the plastic granulate 7 can be in a fluid phase (plastic melt), a solid phase (granular form) or a mixed phase comprising liquid and solid phases.

For measurement of the axial distribution of the plastic granulate 7, ultrasound transit time measurements are carried out at a plurality of axial positions. Four axial positions are provided for that purpose in FIG. 3. The measurements can be carried out by reflection or transmission measurements.

Alternatively, measurement can also be implemented with an ultrasound transducer alternately at different axial positions over a plurality of injection moulding cycles in order to be able to infer the backpressure length 1 in the plasticizing screw 6.

The sensors 9 bear against the cylinder wall 8. It can also be provided that the sensors 9 are arranged sunk in blind bores in the cylinder wall 8. That can be advantageous in relation to space problems with heating strips mounted on the plasticizing cylinder 3.

The sensors 9 are connected to an evaluation unit 12, in which case a closed-loop and/or open-loop control device 13 can automatically or semi-automatically manipulate the degree of underfeed by way of the metering unit 10. In that way the backpressure length 1 and/or the screw return speed 2 can be adjusted.

The closed-loop and/or open-loop control device 13 can be connected to a machine control system of the injection moulding machine 15, it can be connected by way of a signal transmission system, and/or can be part of the machine control system.

An operating and/or display device 14 is provided to display to a user of the injection moulding machine 15 parameters like the backpressure length 1 and/or the screw return speed 2 and possibly to communicate commands from the user to the closed-loop and/or open-loop control device 13 by way of the operating and/or display device 14.

The system can be selectively integrated into the machine control system of the injection moulding machine 15 or can be used as an autonomous system.

Those sensors 9 measure continuously during a screw return in order to be able to derive a close curve in respect of a backpressure length 1 by interpolation. The backpressure length 1 has to be corrected by a volume which has already been meteredly applied.

Figure 4A:
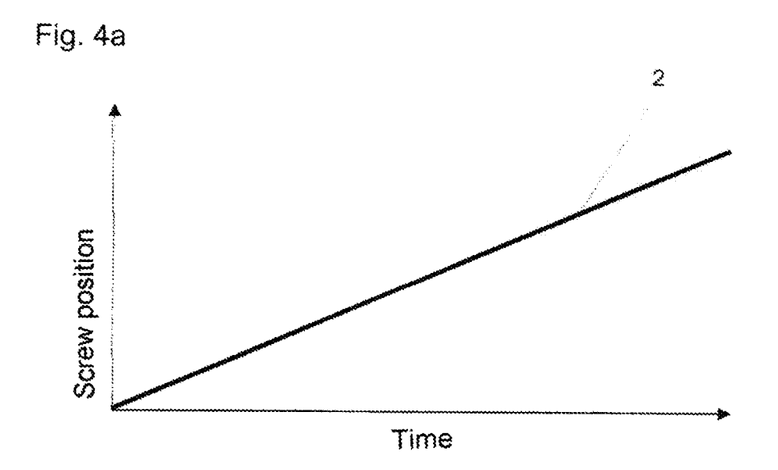
FIGS. 4a-4b show graphs of a screw position in relation to time with a constant return of the plasticizing screw and in an underfed mode of operation without closed-loop control of the screw return speed.

FIG. 4a shows a graph of an aimed linear screw return speed 2 during the return movement of the plasticizing screw 6 in relation to time.

The plasticizing screw 6 is underfed during the metering operation in such a way that the screw return speed 2 of the plasticizing screw 6 (not shown) is constant.

FIGS. 4b to 5b (in contrast to FIG. 4a) show uncontrolled screw return curves in respect of the screw return speed 2 of the plasticizing screw 6 with different degrees of underfeed.

Figure 4B:
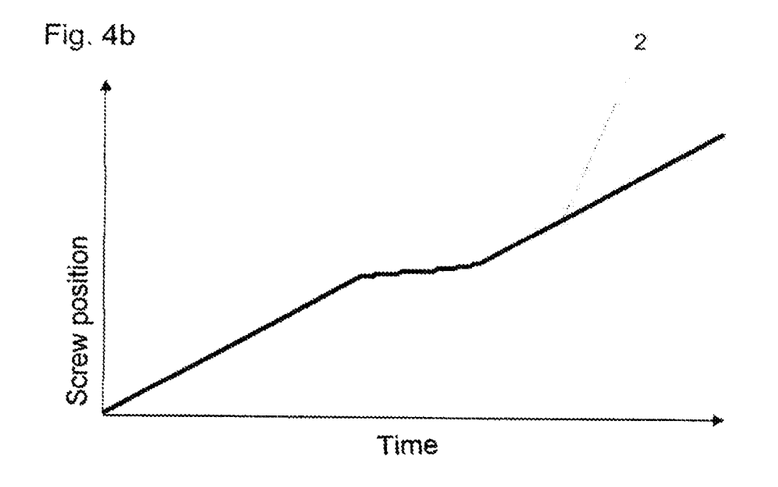

FIG. 4b shows the screw return speed 2 of the plasticizing screw 6 in relation to time, wherein the degree of underfeed is not so selected that the screw return speed 2 is constant.

The screw return curve can vary for different backpressure lengths 1 and the backpressure lengths 1 can be of different extents with different screw return curves.

Particularly preferably the screw return speed 2 is manipulated having regard to the parameter of the backpressure length 1 and/or the backpressure length 1 is manipulated having regard to the parameter of the screw return speed 2.

Figure 5A:
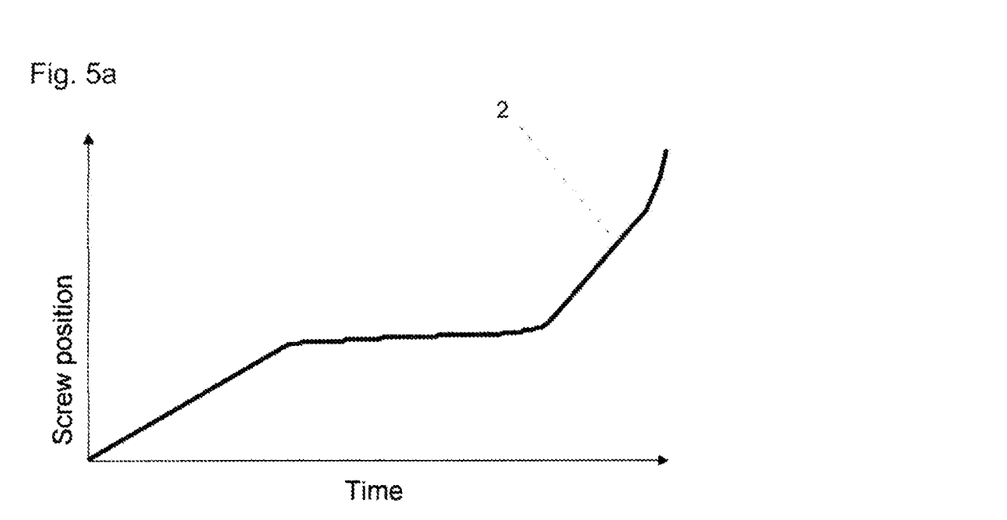
FIGS. 5a-5b show two further graphs of the screw return speed in an underfed mode without closed-loop control of the screw return speed.

FIG. 5a shows the screw return speed 2 of the plasticizing screw 6, wherein the plasticizing screw 6 can be underfed during the metering operation in such a way that the screw return speed 2 can be reduced in order in the time evolution to approach the last region of an increased screw return speed 2 in the direction of a constant screw return speed 2.

Figure 5B:
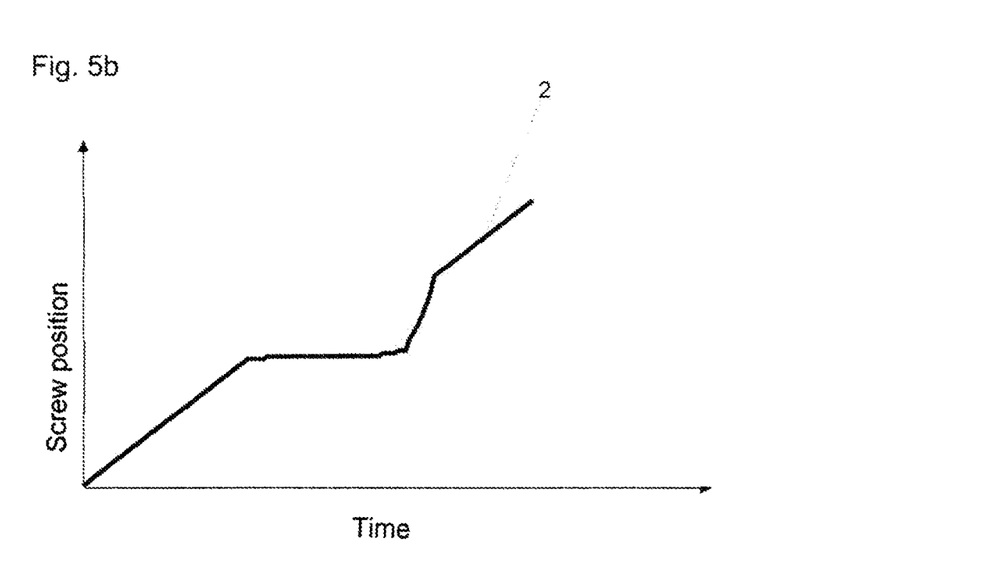

FIG. 5b shows the screw return speed 2 of the plasticizing screw 6, wherein the plasticizing screw 6 can be underfed during the metering operation in such a way that the screw return speed 2 can be increased in order in the time evolution to approach the average region of a reduced screw return speed 2 in the direction of a constant screw return speed 2.

A total metering time by way of the plasticizing screw 6 (not to be confused with metering by way of the filling hopper 11) can differ from one cycle to another, in which respect the metering curves of the plasticizing screw 6 can claim different periods of time in relation to the injection cycle.

Figure 6:
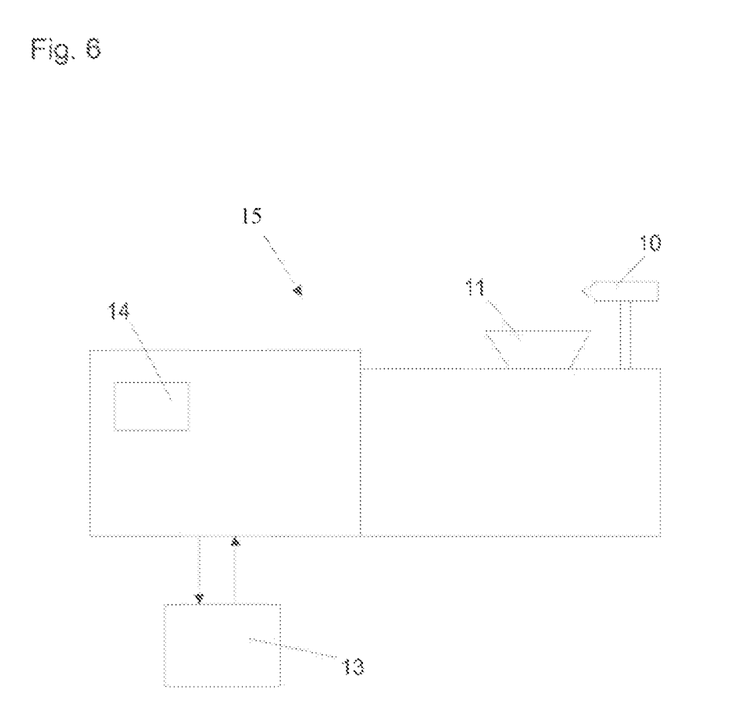
FIG. 6 shows an injection moulding machine with a closed-loop and/or open-loop control device.

FIG. 6 shows an injection moulding machine 15 having a closed-loop and/or open-loop control device 13, wherein the control device 13 is connected to the injection moulding machine 15 by a signal transmission. The control device 13 can generally also be part of the injection moulding machine 15—for example part of the machine control system.

The injection moulding machine 15 includes at least one axially extending plasticizing cylinder of a plasticizing unit having a plasticizing screw arranged displaceably and rotatably in a cylinder bore of the plasticizing cylinder (this is not shown for simplicity of the drawing).

The plastic granulate 7 can be fed to the plasticizing unit 4 by the metering unit 10 by way of a filling hopper 11 to be plasticized in the plasticizing screw 6 of the plasticizing cylinder 3. The form of the metering unit 10 and the filling hopper 11 can generally be of any desired form.

By way of the operating and/or display device 14 it is possible for an operator of the injection moulding machine to act on closed-loop and/or open-loop control of the backpressure length 1 and/or the screw return speed 2.

Parameters which are related to the backpressure length 1 and/or the screw return speed 2, and/or the backpressure length 1 and/or the screw return speed 2, can be displayed per se by way of the operating and/or display device 14.

The closed-loop and/or open-loop control device 13 is configured in at least one operating mode to carry out a method of influencing the backpressure length 1 and/or the screw return speed 2.

In particular the screw return speed 2 can be controlled in dependence on at least one sensor signal from the sensors 9 and a currently prevailing screw return curve, wherein sensor signals and screw retraction curves of preceding cycles can be employed for the closed-loop control action as the screw return curve is dependent on a degree of underfeed.

Figure 7:
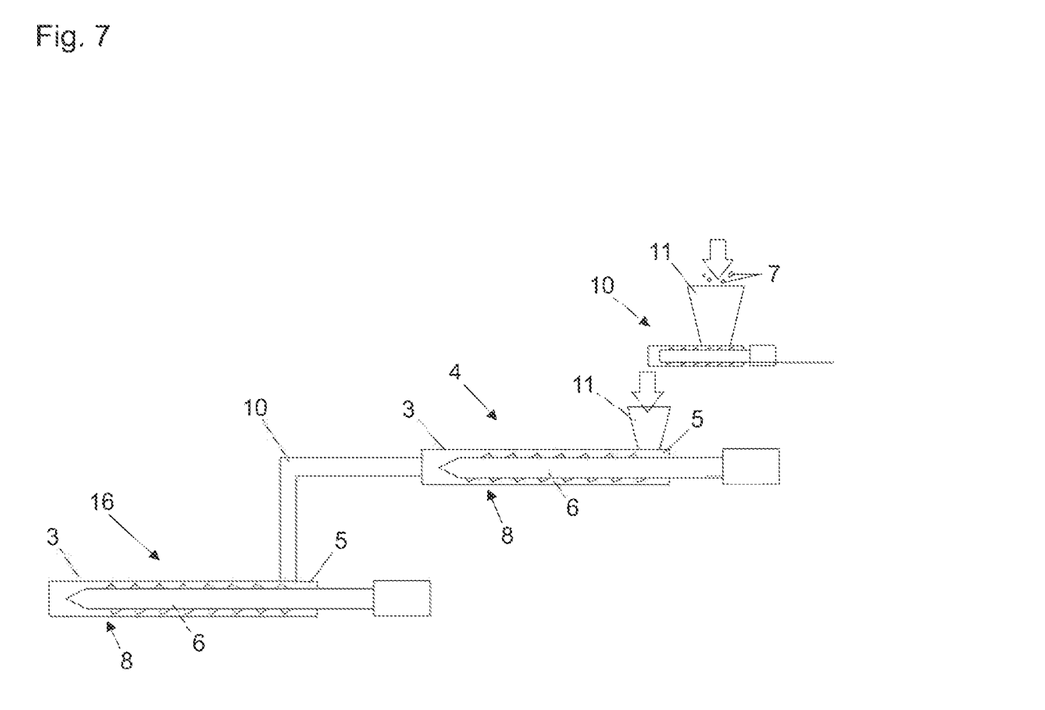
FIG. 7 shows a multi-stage plasticizing method with a metering unit, a plasticizing unit and a further plasticizing unit, wherein a backpressure length and a screw return speed in the plasticizing unit and the further plasticizing unit is controlled.

FIG. 7 shows a multi-stage plasticizing process in a cascade configuration, wherein plastic granulate 7 is fed to the plasticizing unit 4 in controlled fashion by way of the metering unit 10 in dependence on the backpressure length 1 and optionally in dependence on the screw return speed 2. In general a metered feed of moulding material in melt form is also conceivable.

The plastic granulate 7 is plasticized in the plasticizing unit 4, the plasticizing unit 4 being operated in the underfeed mode. The melt is metered by way of a metering unit 10 in the form of a feed line to a further plasticizing unit 16 in dependence on the backpressure length 1 and optionally in dependence on the screw return speed 2, with the further plasticizing unit 16 being operated in underfeed mode.

Figure 8A:
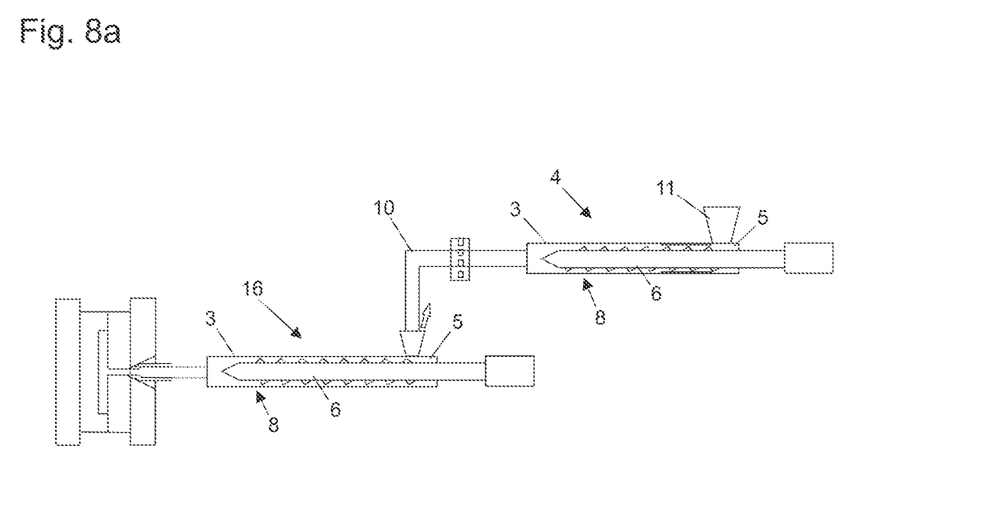
FIGS. 8a-8b show a two-stage plasticizing method with a degassing operation and a process for closed-loop control of a material feed at an injection moulding machine with a subdivided metering operation.

FIG. 8a shows an injection moulding installation in the form of an injection moulding machine having two plasticizing units 4, 16, melt being injected into a moulding tool. A degassing process is effected between the plasticizing unit 4 and the further plasticizing unit 16. Application in relation to a multi-stage plasticizing method is also possible.

A melt filter is arranged at the metering unit 10.

The material feed can be controlled by the plasticizing screw 6 of the plasticizing unit 4 being in the form of feed screw and the plasticizing screw 6 of the further plasticizing unit 16 being in the form an injection screw, wherein a material feed as between the feed screw and the injection screw is at least partially operated in an underfed mode.

The underfeed leads to a drop in a melt pressure in the feed region between the two plasticizing units 4, 16, whereby volatile and/or gaseous components of the melt can escape (indicated with an arrow).

Figure 8B:
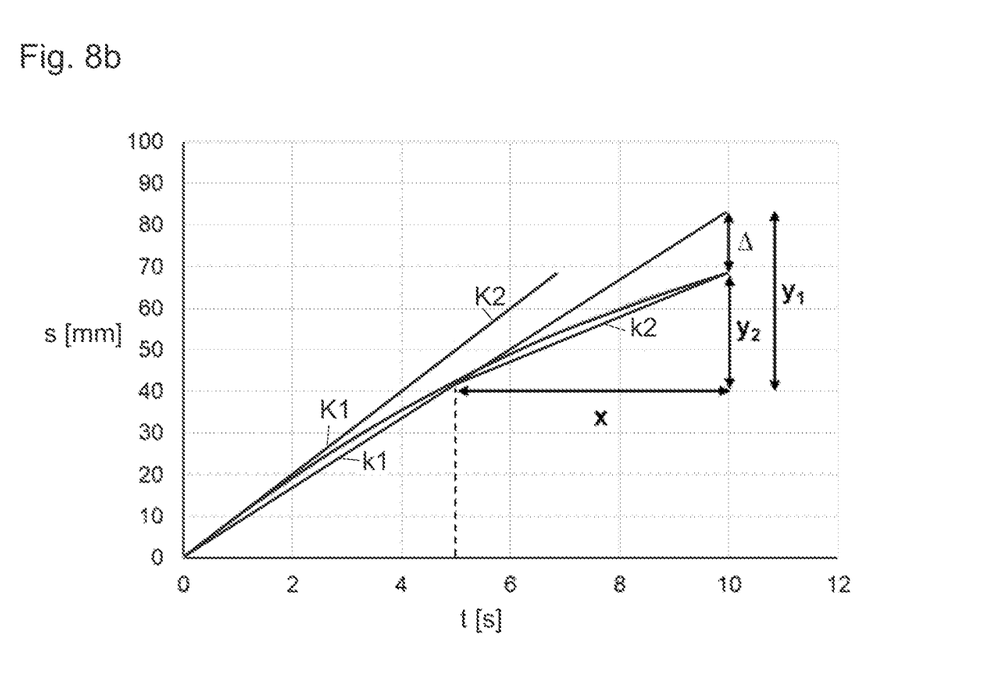

FIG. 8b shows a preferred embodiment of the method according to the invention, wherein material is meteredly supplied controlled by the injection screw.

The metering operation of the injection screw is subdivided into two, preferably equally long portions of the duration x, wherein melt is fed in the illustrated travel-time graph. The portions K1 and K2 represent a stable metering operation with a constant gradient over a plasticizing screw travel s in relation to time t. In this case there is a sufficient material feed, wherein the further plasticizing unit 16 is possibly not operated in an underfeed mode.

Portions k1 and k2 show a dosing operation which collapses by virtue of a small material feed, wherein A represents a difference in relation to a metering operation without collapse. In a degassing operation an underfed material feed can be of particular advantage in relation to a flow entry region. In that case a threshold value Δv can be defined in relation to the difference Δ.

Particularly in the degassing operation it is possible, preferably from one cycle to another to reduce a rotary speed of the plasticizing screw 6 if the amount of k1-k2 is less than a predetermined difference Δv, to increase the rotary speed of the plasticizing screw 6 if the amount of k1-k2 is greater than the predetermined difference Δv, and/or to keep the rotary speed of the plasticizing screw 6 constant if the amount of k1-k2 is equal to the predetermined difference Δv.

For monitoring the dosing operation it is possible for example to provide a filling level sensor, preferably beneath a degassing or suction removal means to prevent that region from being overfilled.

The material feed can be controlled for example by an axial speed v of the injection screw during the metering operation with a predetermined dynamic pressure p as the first time derivitive of the screw travel being correlated with the filling level of the material, preferably in a transitional region, in such a way that a second derivitive K is formed. A degree of underfeed is adjusted by way of that characteristic value of the second derivitive.

Instead of a change in the axial speed v it is also possible for example to consider an average torque M over a plurality of time portions during the metering operation and similarly to the consideration of the axial speed v to form a second time derivitive K' of the torque M.

It is also conceivable that the axial speed v is predetermined and the time change in the average torque M during the metering operation is used as a measurement in respect of the underfeed by the second time derivitive K' of the torque M being formed.

With a predetermined axial speed v it is also possible to use a change in the dynamic pressure p during the metering operation as a measurement in respect of the underfeed, wherein the second time derivitive K' of the dynamic pressure p is formed.

The rotary speed of the feed screw is altered during the closed-loop control process in such a way that a predetermined characteristic value K, K', K" is set and/or degassing and/or conveyor capacities can be optimised.

LIST OF REFERENCES

1 backpressure length
2 screw return speed
3 plasticizing cylinder
4 plasticizing unit
5 cylinder bore
6 plasticizing screw
7 plastic granulate
8 cylinder wall
9 sensor
10 metering unit
11 filling hopper
12 evaluation unit
13 closed-loop and/or open-loop control device
14 operating and/or display device
15 injection moulding machine
16 further plasticizing unit

The invention claimed is:

1. A method of influencing a backpressure length and a screw return speed in an axially extending plasticizing cylinder of a plasticizing unit for an injection moulding machine, the plasticizing unit including a plasticizing screw arranged displaceably and rotatably in a cylinder bore of the plasticizing cylinder, the method comprising:

metering plastic granulate fed to the plasticizing unit depending on a desired backpressure length in the plasticizing unit, wherein the plasticizing unit is operated in underfed mode, and controlling the screw return speed using a screw peripheral speed of the plasticizing screw and a metered amount of the plastic granulate as setting variables.

2. The method according to claim 1, wherein metering of the plastic granulate fed to the plasticizing unit is carried out depending on a desired screw return speed in the plasticizing unit.

3. The method according to claim 1, wherein the plasticizing screw is underfed during the metering of the plastic granulate such that the backpressure length in the plasticizing unit is constant.

4. The method according to claim 1, wherein the plasticizing screw is underfed during the metering of the plastic granulate such that the backpressure length in the plasticizing screw is shortened.

5. The method according to claim 1, wherein the plasticizing screw is underfed during the metering of the plastic granulate such that the backpressure length in the plasticizing screw is increased.

6. The method according to claim 1, wherein the plasticizing screw is underfed during the metering of the plastic granulate such that the screw return speed of the plasticizing screw is constant.

7. The method according to claim 1, wherein the plasticizing screw is underfed during the metering of the plastic granulate such that the screw return speed of the plasticizing screw is reduced.

8. The method according to claim 1, wherein the plasticizing screw is underfed during the metering of the plastic granulate such that the screw return speed of the plasticizing screw is increased.

9. The method according to claim 1, further comprising a sensor configured to ascertain the backpressure length.

10. The method according to claim 9, wherein the sensor is a pressure sensor and/or an ultrasound sensor and/or a capacitive sensor and/or an optical sensor.

11. The method according to claim 9, wherein the sensor is arranged in and/or at a cylinder wall of the plasticizing cylinder.

12. The method according to claim 1, wherein the screw return speed is closed-loop controlled depending on (i) a sensor signal of a sensor and/or (ii) a screw retraction curve.

13. The method according to claim 1, wherein the plasticizing unit is a first plasticizing unit, the method further comprising metering moulding material to a second plasticizing unit, wherein the moulding material is fed depending on a desired backpressure length and/or a desired screw return speed in the second plasticizing unit, wherein the second plasticizing unit is operated in underfed mode.

14. An injection moulding machine comprising:

a plasticizing unit including an axially extending plasticizing cylinder and a plasticizing screw arranged displaceably and rotatably in a cylinder bore of the plasticizing cylinder; and a closed-loop and/or open-loop control device configured to be connected to the plasticizing unit by a signal transmission, the closed-loop and/or open-loop control device being configured to carry out the method according to claim 1.

15. A method of influencing a backpressure length and/or a screw return speed in an axially extending plasticizing cylinder of a plasticizing unit for an injection moulding machine, the plasticizing unit including a plasticizing screw arranged displaceably and rotatably in a cylinder bore of the plasticizing cylinder, the method comprising:
  metering plastic granulate fed to the plasticizing unit depending on a desired backpressure length in the plasticizing unit, wherein the plasticizing unit is operated in underfed mode,
  wherein metering of the plastic granulate fed to the plasticizing unit is further carried out depending on a desired screw return speed in the plasticizing unit.

16. An injection moulding machine comprising:
  a plasticizing unit including an axially extending plasticizing cylinder and a plasticizing screw arranged displaceably and rotatably in a cylinder bore of the plasticizing cylinder; and
  a closed-loop and/or open-loop control device configured to be connected to the plasticizing unit by a signal transmission, the closed-loop and/or open-loop control device being configured to carry out the method according to claim 15.

17. A method of influencing a backpressure length and/or a screw return speed in an axially extending plasticizing cylinder of a plasticizing unit for an injection moulding machine, the plasticizing unit including a plasticizing screw arranged displaceably and rotatably in a cylinder bore of the plasticizing cylinder, the method comprising:
  metering plastic granulate fed to the plasticizing unit depending on a desired backpressure length in the plasticizing unit, wherein the plasticizing unit is operated in underfed mode,
  wherein the plasticizing screw is underfed during the metering of the plastic granulate such that the screw return speed of the plasticizing screw is constant.

18. An injection moulding machine comprising:
  a plasticizing unit including an axially extending plasticizing cylinder and a plasticizing screw arranged displaceably and rotatably in a cylinder bore of the plasticizing cylinder; and
  a closed-loop and/or open-loop control device configured to be connected to the plasticizing unit by a signal transmission, the closed-loop and/or open-loop control device being configured to carry out the method according to claim 17.

19. A method of influencing a backpressure length and/or a screw return speed in an axially extending plasticizing cylinder of a plasticizing unit for an injection moulding machine, the plasticizing unit including a plasticizing screw arranged displaceably and rotatably in a cylinder bore of the plasticizing cylinder, the method comprising:
  metering plastic granulate fed to the plasticizing unit depending on a desired backpressure length in the plasticizing unit, wherein the plasticizing unit is operated in underfed mode; and
  ascertaining the backpressure length using a sensor.

20. The method according to claim 19, wherein the sensor is arranged in and/or at a cylinder wall of the plasticizing cylinder.

21. An injection moulding machine comprising:
  a plasticizing unit including an axially extending plasticizing cylinder and a plasticizing screw arranged displaceably and rotatably in a cylinder bore of the plasticizing cylinder; and
  a closed-loop and/or open-loop control device configured to be connected to the plasticizing unit by a signal transmission, the closed-loop and/or open-loop control device being configured to carry out the method according to claim 19.

* * * * *